Sept. 12, 1939.  J. MITCHELL  2,173,022
FLOW BEAN FOR OIL WELLS
Filed March 23, 1938

Juanita Mitchell, INVENTOR

BY Victor J. Evans & Co.

ATTORNEYS

Patented Sept. 12, 1939

2,173,022

UNITED STATES PATENT OFFICE 2,173,022

FLOW BEAN FOR OIL WELLS

Juanita Mitchell, Los Angeles, Calif.

Application March 23, 1938, Serial No. 197,709

1 Claim. (Cl. 138—46)

This invention relates to flow beans for oil wells and more particularly to a Venturi element and cooperating flow restricting member and has for the primary object the provision of means for increasing the life and efficiency of said element and member and which is capable of withstanding the wearing effect of sands and the like carried by the oil flow for a maximum period of time.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing a portion of a flow bean equipped with a Venturi element and cooperating flow restricting member constructed in accordance with the present invention.

Figure 1:
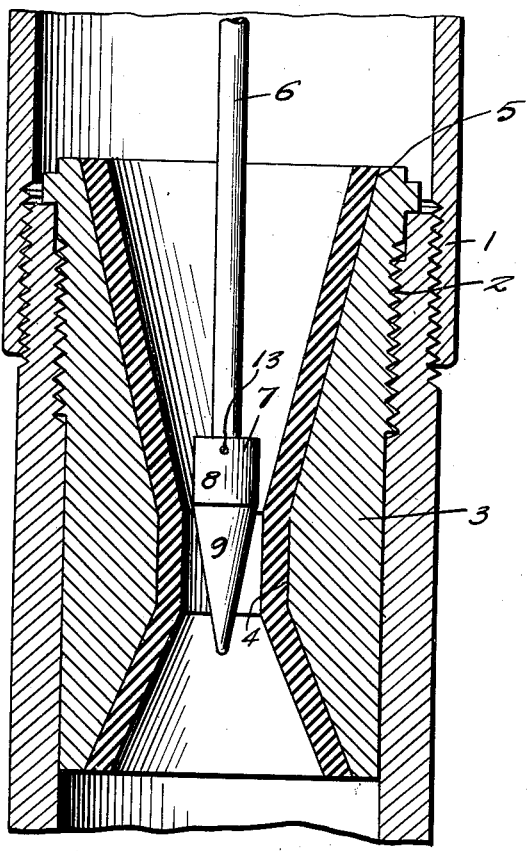
Figure 2:
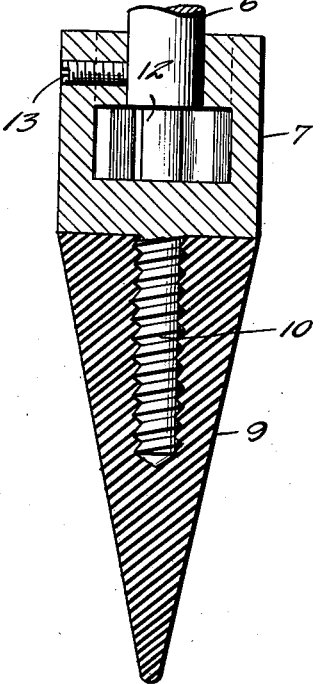
Figure 2 is a fragmentary vertical sectional view showing the flow restricting member.
Figure 3:
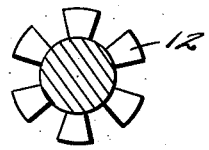
Figure 3 is a transverse sectional view showing lugs on the shaft of the flow restricting member.

Referring in detail to the drawing, the numeral 1 indicates a fragmentary portion of a flow bean used on oil wells and is internally screw threaded, as shown at 2, to have threaded therein a shell 3. The shell 3 forms a portion of a choke for the flow bean and has a bore 4, a portion of which is of cylindrical formation of a restricted diameter. From each end of the restricted cylindrical portion the bore gradually increases in diameter to the ends of the shell. The bore receives a liner 5 constructed of a synthetic rubber which will resist wear from sands and the like carried by the flow of oil passing through the bore 4. Received in the bore 4 and supported by a shaft 6 is a flow restricting element or tip 7 including a cylindrical portion 8 and a conical-shaped portion 9. The shaft 6 is supported in any well known manner in the flow bean so that it may be manually actuated to move the tip 7 within the bore 4 for increasing and decreasing the flow of oil therethrough. The cylindrical portion 8 includes a screw threaded shank 10 threaded in a bore of the conical shaped portion 9 rendering the portions 8 and 9 separable. The portion 8 may be constructed of any material suitable for the purpose while the portion 9 is made of a synthetic rubber similar to the liner 5 so as to be capable of withstanding wearing effect of sands thereagainst. The portion 8 of the tip has a socket provided with internal projections 11. The shaft 6 is provided with projections 12 to interlock with the projections 11 and to prevent relative rotation of the shaft with the tip a set screw 13 carried by the tip is turned in engagement with the shaft 6. The shell 3 and its liner provides a very efficient Venturi element which will, when positioned in a flow bean, choke the flow of oil therethrough and to further regulate the flow of oil through the Venturi element. The tip is employed and moved relative to the cylindrical portion of the bore of the Venturi element. The tip or the conical shaped portion 9 thereof and the liner 5 being constructed of synthetic rubber will render the device useful for a maximum period of time.

Figure 5:
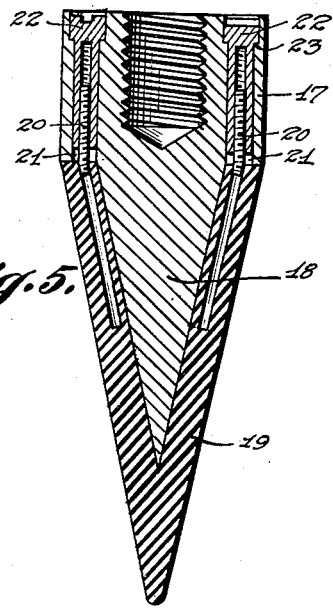
Figure 5 is a vertical sectional view showing the modification of the flow restricting member.
Figure 4:
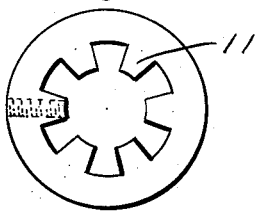
Figure 4 is an end view showing the lugs within the flow restricting member.

Referring to the form of invention shown in Figure 5 the tip or flow restricting member includes a cylindrical portion 17 and a conical shaped extension 18 with the conical shaped portion 19 fitted thereon and anchored in the conical shaped portion 19 are screw threaded studs 20 loosely received within openings 21 of the cylindrical portion 17. Headed sleeves 22 which are internally screw threaded are threaded on the studs 20 within the openings 21 having the heads thereof bearing against internal shoulders 23 formed in the openings 21. Thus it will be seen that the sleeves and studs efficiently secure the conical shaped portion onto the cylindrical shaped portion 17 but will permit separation of these parts whenever desired.

What is claimed is:

In a flow bean tip for oil wells comprising the combination of a cylindrical portion including means for detachably mounting the same on a shaft and an extension, a conical shaped portion mounted on said extension and of an abrasion resisting synthetic material, stud bolts anchored in the conical shaped portion, said cylindrical portion having openings to loosely receive the stud bolts, and headed internally screw threaded sleeves received in said openings and threaded on the stud bolts.

JUANITA MITCHELL.